United States Patent
Hsu et al.

(10) Patent No.: US 11,329,376 B2
(45) Date of Patent: May 10, 2022

(54) BEAMFORMING DEVICE, CALIBRATION METHOD AND CALIBRATION SYSTEM FOR THE SAME

(71) Applicant: WISTRON NEWEB CORPORATION, Hsinchu (TW)

(72) Inventors: Chih-Min Hsu, Hsinchu (TW); Tsun-Che Huang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 45 days.

(21) Appl. No.: 16/876,157

(22) Filed: May 18, 2020

(65) Prior Publication Data

US 2020/0373659 A1    Nov. 26, 2020

Related U.S. Application Data

(60) Provisional application No. 62/851,111, filed on May 22, 2019.

(30) Foreign Application Priority Data

Apr. 15, 2020    (TW) .................................. 109112579

(51) Int. Cl.
*H01Q 3/26* (2006.01)
*H04B 7/06* (2006.01)
(Continued)

(52) U.S. Cl.
CPC .............. *H01Q 3/267* (2013.01); *H01Q 3/36* (2013.01); *H04B 7/0617* (2013.01); *H04B 17/12* (2015.01); *H04B 17/21* (2015.01)

(58) Field of Classification Search
CPC .... H04B 7/0617; H04B 7/0456; H04B 17/12; H04B 17/21; H04B 7/0408; H04B 7/0482;
(Continued)

(56) References Cited

U.S. PATENT DOCUMENTS

| 8,086,242 B2 | 12/2011 | Kent et al. |
| 8,111,780 B2 | 2/2012 | Clerckx et al. |

(Continued)

FOREIGN PATENT DOCUMENTS

| CN | 101675599 B | 5/2013 |
| CN | 104919716 A | 9/2015 |
| TW | I435558 B | 4/2014 |

*Primary Examiner* — Khanh C Tran
(74) *Attorney, Agent, or Firm* — McClure, Qualey & Rodack, LLP

(57) ABSTRACT

A beam forming device, a calibration method and a calibration system using the same are provided. The beam forming device includes a processor, a memory unit, a baseband circuit, and a plurality of antenna modules. The baseband circuit is electrically connected to the processor and the memory unit. The plurality of antenna modules each include multiple antenna elements, multiple phase shifters and multiple amplifiers corresponding to the multiple antenna elements. The memory unit stores a plurality of reference codebooks and instruction data, the plurality of reference codebooks each have a reference angle and the reference angles are different from each other, and the instruction data is used to specify a predetermined codebook from the plurality of reference codebooks to control multiple antenna modules, thereby enabling multiple antenna modules to transmit and receive signals.

10 Claims, 7 Drawing Sheets

(51) Int. Cl.
*H01Q 3/36* (2006.01)
*H04B 17/21* (2015.01)
*H04B 17/12* (2015.01)

(58) Field of Classification Search
CPC .... H04B 7/086; H04B 7/0417; H04B 7/0626; H04B 7/0632; H01Q 1/246; H01Q 3/24; H01Q 3/2605; H01Q 3/267; H01Q 3/36
See application file for complete search history.

(56) References Cited

U.S. PATENT DOCUMENTS

| | | | |
|---|---|---|---|
| 9,225,396 | B2 | 12/2015 | Maltsev et al. |
| 10,720,979 | B1* | 7/2020 | Paulotto ............... H04B 7/0682 |
| 2017/0366242 | A1* | 12/2017 | Lee ...................... H04B 7/0408 |
| 2019/0044756 | A1* | 2/2019 | Zhao .................... H04B 7/0478 |
| 2020/0220590 | A1* | 7/2020 | Sun ...................... H04L 25/0226 |
| 2020/0295972 | A1* | 9/2020 | Hemo .................. H04B 17/102 |
| 2020/0336221 | A1* | 10/2020 | Sebastian ............. H04B 17/102 |
| 2021/0098882 | A1* | 4/2021 | Paulotto ................ H01Q 1/243 |
| 2021/0249768 | A1* | 8/2021 | Ioffe ..................... H01Q 21/06 |

* cited by examiner

BEAMFORMING DEVICE, CALIBRATION METHOD AND CALIBRATION SYSTEM FOR THE SAME

CROSS-REFERENCE TO RELATED PATENT APPLICATION

This application claims the benefit of priority to Taiwan Patent Application No. 109112579, filed on Apr. 15, 2020. The entire content of the above identified application is incorporated herein by reference.

This application claims priority from the U.S. Provisional Patent Application Ser. No. 62/851,111 filed May 22, 2019, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a beam forming device, a calibration method and a calibration system for the same, and more particularly to a beam forming device, a calibration method and a calibration system for the same capable of calibrating phase differences between antenna modules.

BACKGROUND OF THE DISCLOSURE

In the field of millimeter wave communications, path loss associated with an antenna module of a beamforming device is much greater than similar devices with lower operating frequencies. Beamforming technology is commonly used to increase the communication range. The most common architecture utilizes one baseband module to control a plurality of antenna modules. In high-frequency applications, due to the small wavelength, it is difficult to meet equipment requirements during manufacturing. For example, a wavelength is only about 5 mm at an operating frequency of 60 GHz. This means that whenever a path change of 0.1 mm occurs, a phase difference of 36 degrees will be caused between the antenna modules.

When there is a phase difference between the antenna modules, the phase difference will result in a lower equivalent isotropically radiated power (EIRP) during beamforming, and even lead to poor side-lobe levels (SLL), thereby causing an actual beamforming pattern to differ from an ideal beamforming pattern by a deviation.

Therefore, correcting the phase difference between the antenna modules of the beamforming device by means of calibration to overcome the above-mentioned defects has become an important issue in the art.

SUMMARY OF THE DISCLOSURE

In response to the above-referenced technical inadequacies, the present disclosure provides a beam forming device, a calibration method and a calibration system for the same capable of calibrating phase differences between antenna modules.

In one aspect, the present disclosure provides a calibration method for a beam forming device including a processor, a memory unit, a baseband circuit and a plurality of antenna module, the plurality of antenna modules includes a reference antenna module and at least one calibration antenna module, and each of the plurality of antenna modules includes a plurality of antenna elements, a plurality of phase shifters and a plurality of amplifiers corresponding to the plurality of antenna elements, and the calibration method includes: configuring the memory unit to store a first reference codebook, a second reference codebook, and a third reference codebook, wherein the first reference codebook is used to control a plurality phase shifters and a plurality of amplifiers of the reference antenna module, and the first reference codebook has a first reference angle, the second reference codebook has a second reference angle, and the third reference codebook has a third reference angle; and performing a test process on the at least one calibration antenna module. The test process includes the following steps: configuring the baseband circuit to control, according to a predetermined target pattern, the reference antenna module with a plurality records of control data corresponding to the predetermined target pattern in the first reference codebook, and configuring the baseband circuit to control the at least one calibration antenna module by using a plurality records of control data corresponding to the predetermined target pattern respectively in the first reference codebook, the second reference codebook and the third reference codebook to generate a plurality of test signals; configuring a receiver to receive the plurality of test signals; configuring the computing device to process the plurality of test signals to respectively calculate equivalent isotropically radiated powers (EIRPs) of the predetermined target pattern respectively corresponding to the plurality of test signals and generate a plurality of test results; and configuring the computing device to set one of the first reference codebook, the second reference codebook and the third reference codebook having the maximum EIRP as at least one predetermined codebook used in transmitting and receiving signals in the predetermined target pattern by the beamforming device according to the plurality of test results.

In another aspect, the present disclosure provides a calibration system including a computing device, a beamforming device, a receiver, and a measuring device. The beam forming device is connected to the computing device. The beam forming device includes a processor, a memory unit, a baseband circuit, and a plurality of antenna modules. The plurality of antenna modules include a reference antenna module and at least one calibration antenna module, wherein each of the plurality of antenna modules includes a plurality of antenna elements, and a plurality of phase shifters and a plurality of amplifiers corresponding to the plurality of antenna elements. The baseband circuit is configured to store a first reference codebook, a second reference codebook, and a third reference codebook into the memory unit, wherein the first reference codebook is used to control a plurality phase shifters and a plurality of amplifiers of the reference antenna module, and the first reference codebook has a first reference angle, the second reference codebook has a second reference angle, and the third reference codebook has a third reference angle. The computing device is configured to perform a test process on the at least one calibration antenna module, the test process includes the following steps: configuring the baseband circuit to control, according to a predetermined target pattern, the reference antenna module with a plurality records of control data corresponding to the predetermined target pattern in the first reference codebook, and configuring the baseband circuit to control the at least one calibration antenna module by using a plurality records of control data corresponding to the predetermined target pattern respectively in the first reference codebook, the second reference codebook and the third reference codebook to generate a plurality of test signals; configuring the receiver to receive the plurality of test signals; configuring the computing device to process the plurality of test signals to respectively calculate equivalent isotropically radiated powers (EIRPs) of the predetermined target pattern respectively corresponding to the plurality of test signals and generate a plurality of test results; and configuring the computing device to set one of the first reference codebook, the second reference codebook and the third reference codebook having the maximum EIRP as at least one predetermined codebook used in transmitting and receiving signals in the predetermined target pattern by the beamforming device according to the plurality of test results.

In yet another aspect, the present disclosure provides a beamforming device including a processor, a memory unit, a baseband circuit, and a plurality of antenna modules. The baseband circuit is electrically connected to the processor and the memory unit. The plurality of antenna modules each include multiple antenna elements, multiple phase shifters and multiple amplifiers corresponding to the multiple antenna elements. The memory unit stores a plurality of reference codebooks and instruction data, the plurality of reference codebooks each have a reference angle and the reference angles are different from each other, and the instruction data is used to specify a predetermined codebook from the plurality of reference codebooks to control multiple antenna modules, thereby enabling multiple antenna modules to transmit and receive signals.

Therefore, the beamforming device, the calibration method and the calibration system using the same provided by the present disclosure can effectively improve the phase precision from the precision supported by the phase shifter according to the reference angles corresponding to the plurality of reference codebooks, and can reduce the number of pre-stored codebooks and calibration time.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
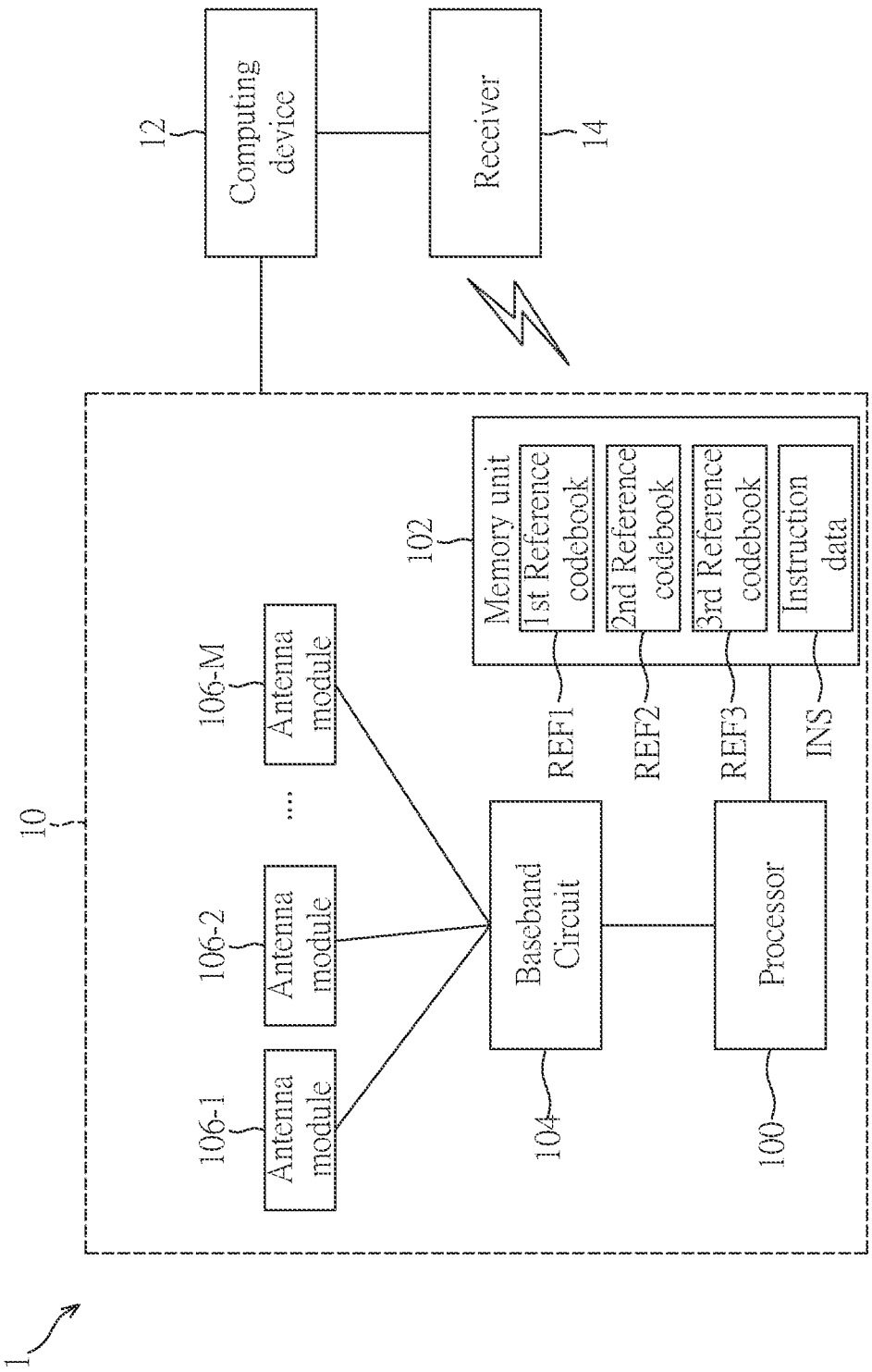
FIG. 1 is a block diagram of a calibration system for a beamforming device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a block diagram of a calibration system for a beamforming device according to an embodiment of the present disclosure. Reference is made to FIG. 1, a first embodiment of the present disclosure provides a calibration system 1, which includes a beamforming device 10, a computing device 12 and a receiver 14.

Figure 2:
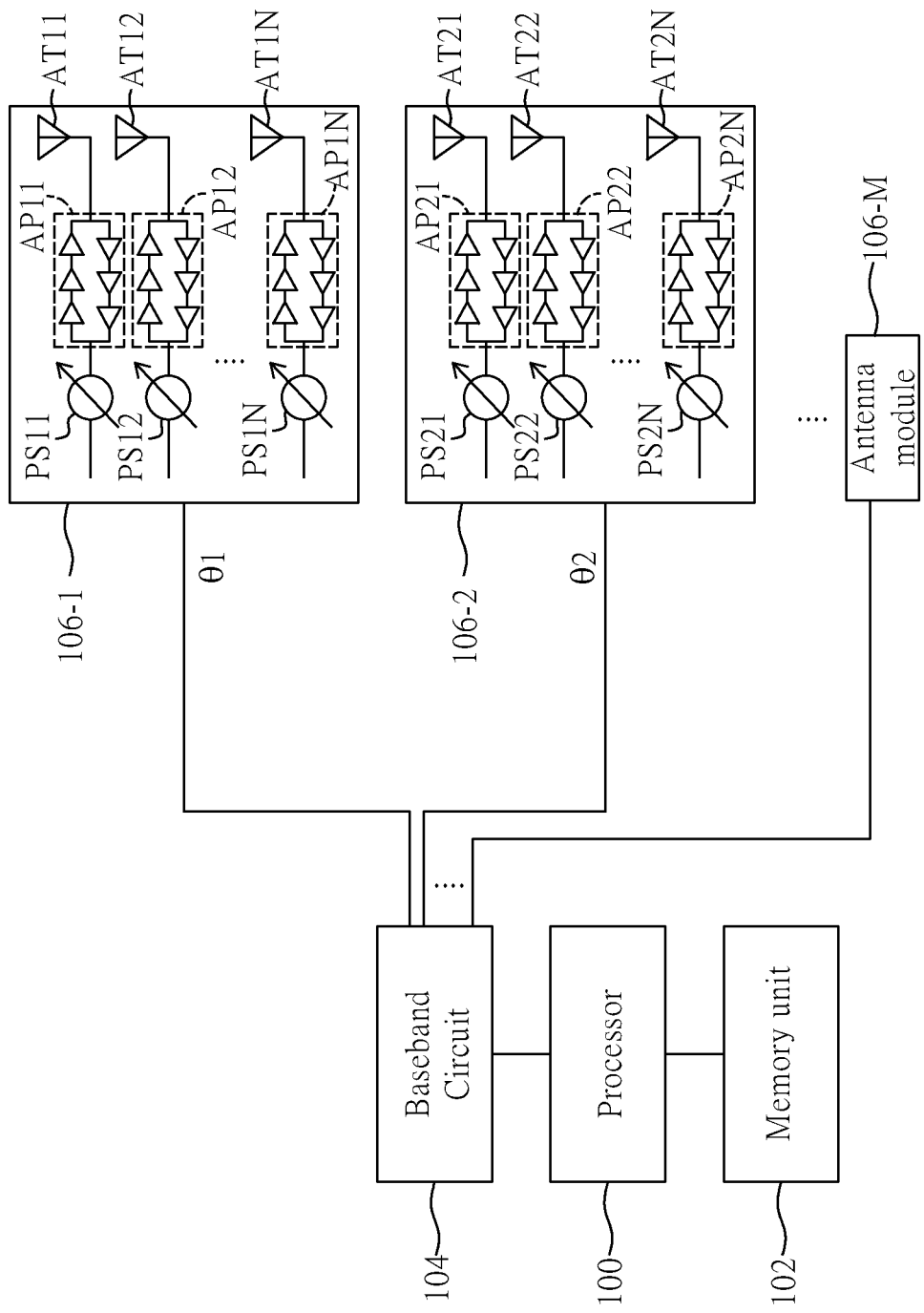
FIG. 2 is a schematic diagram of architecture of a beamforming device according to an embodiment of the present disclosure.

The beamforming device 10 can include a processor 100, a memory unit 102, a baseband circuit 104, and a plurality of antenna modules 106-1, 106-2, . . . , 106-M. Reference can be further made to FIG. 2, which is a schematic diagram of architecture of a beamforming device according to an embodiment of the present disclosure. As shown in FIG. 2, the antenna modules 106-1, 106-2, . . . , 106-M each includes a plurality of antenna elements, and a plurality of phase shifters and a plurality of amplifiers respectively corresponding to the plurality of antenna elements. For example, the antenna module 106-1 can include antenna elements AT11, AT12, . . . , AT1N, and phase shifters PS11, PS12 . . . PS1N and amplifier circuits AP11, AP12 . . . AP1N respectively corresponding to the antenna elements AT11, AT12, . . . , AT1N. The phase shifters PS11, PS12, . . . , PS1N can set different shifting phases for individual antenna elements AT11, AT12 . . . AT1N, and the amplifier circuits AP11, AP12, . . . , AP1N can each include a plurality amplifiers to amplify signals phase-shifted by the phase shifters PS11, PS12, . . . , PS1N, thereby achieving the desired beamforming, and the number of the amplifiers is not limited to the number shown in FIG. 2.

In addition, the processor 100 can be, for example, a microcontroller, a microprocessor, or a digital signal processor (DSP), which is used to obtain control data referred to as "codebook" to assign corresponding phase and amplifier parameters to the antenna elements AT11, AT12, ..., AT1N, and the baseband circuit 104 may be, for example, a baseband processor that controls the antenna modules 106-1, 106-2, ..., 106-M based on the assigned phase and amplifier parameters.

The antenna module 106-1 can also include a digital to analog converter (DAC) to convert baseband digital signal from the baseband circuit 104 into an analog radio frequency signal. Similarly, the antenna module 106-2 can include antenna elements AT21, AT22, ..., AT2N, and phase shifters PS21, PS22, ..., PS2N and amplifier circuits AP21, AP22, ..., AP2N respectively corresponding to the antenna elements AT21, AT22, ..., AT2N.

The beamforming device 10 shown in FIG. 2 includes a plurality of antenna modules 106-1, 106-2, ..., 106-M, and the antenna modules 106-1, 106-2 ... 106-M may have errors due to process deviations. When these hardware errors exist in the beamforming device 10, a main transmission direction of the beamforming may be shifted, transmitted in the wrong direction, or beam energy may be attenuated, due to gain and phase errors of hardware, and correct beamforming will be difficult to achieve. For example, when designing a codebook for the antenna module 106-1, a phase difference θ 1 of the baseband circuit 104 and the antenna module 106-1 is preset to be a fixed value, and the architecture of the antenna module 106-2 is the same as the antenna module 106-1. In theory, a phase difference θ 2 of the baseband circuit 104 and the antenna module 106-2 should be the same as the phase difference θ 1. However, practically, different RF integrated circuits cause unpredictable phase deviations, if the same codebook is utilized, angle and SLL of the maximum EIRP of beamforming may be directly affected. Considering the influence caused by the hardware error, the calibration system and calibration method for the beamforming device of the present disclosure need to be utilized.

In general, when the antenna modules 106-1, 106-2, ..., 106-M are synchronously controlled to perform beamforming in the architecture of FIG. 1, the system gain can be improved. When designing the codebooks for the antenna modules 106-1, 106-2, ..., 106-M, the corresponding phase shifters (such as phase shifters PS11, PS12 ... PS1N and phase shifters PS21, PS22 ... PS2N) are utilized to adjust phase deviations between different antenna modules.

However, the aforementioned calibration precision is still difficult to meet the precision requirements of beamforming modules operating at levels of millimeter wave. To this end, the present disclosure further provides a calibration method for a beamforming device based on the above-mentioned manner. In the present disclosure, the antenna modules 106-1, 106-2 ... 106-M can include a reference antenna module and at least one calibration antenna module, for example, the antenna module 106-1 may be set as a reference antenna module, and the antenna modules 106-2 ... 106-M are set as the calibration antenna modules.

In the present embodiment, the computing device 12 may be a microcontroller, a microprocessor, a digital signal processor (DSP), or an application specific integrated circuit (ASIC), digital logic circuits, mobile computing devices, computers and other electronic devices that can provide computing capabilities. In an embodiment, the computing device 12 may be a computer configured to be electrically connected to the receiver 14, so as to obtain required information from the receiver 14.

The receiver 14 can be, for example, a horn antenna, a wireless base station, or a mobile device. The beamforming device 10 and the receiver 14 can communicate via wireless signal transmission. The receiver 14 can include, for example, a power sensor for detecting strength of the wireless signal from the beamforming device 10. The receiver 14 can measure the signal strength of the beamforming device 10 at different angles.

Figure 3:
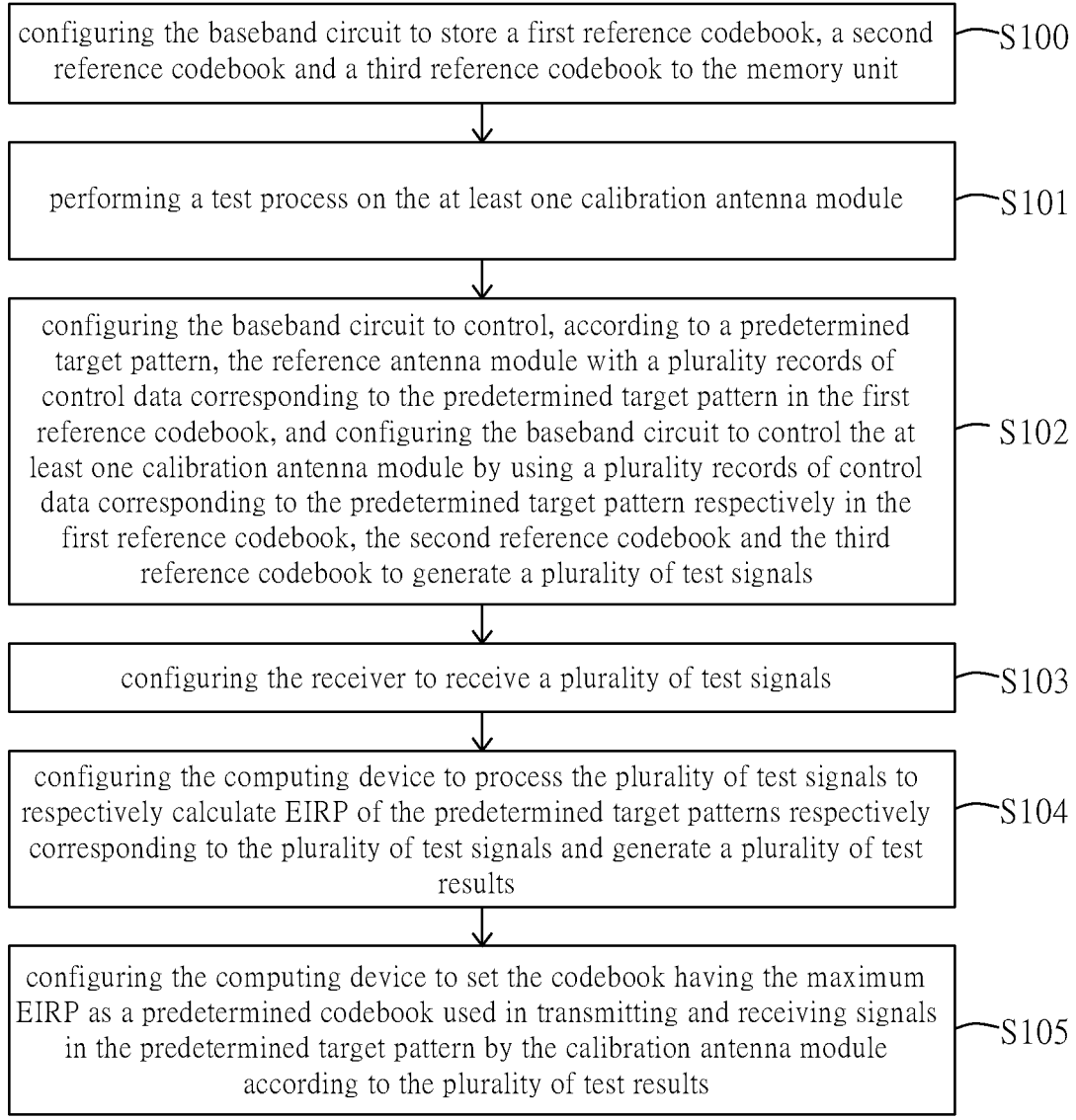
FIG. 3 is a flowchart of a calibration method for a beamforming device according to an embodiment of the present disclosure.

Reference is made to FIG. 3, which is a flowchart of a calibration method for a beamforming device according to an embodiment of the present disclosure. Referring to FIG. 3, an embodiment of the present disclosure provides a calibration method for a beamforming device, and the calibration method is suitable for the calibration system 1 of the foregoing embodiment and includes at least the following steps:

Step S100: configuring the baseband circuit 104 to store a first reference codebook REF1, a second reference codebook REF2 and a third reference codebook REF3 to the memory unit. The first reference codebook REF1 is used to control a plurality of phase shifters and a plurality of amplifiers of the plurality of antenna elements of the reference antenna module. In this case, the first reference codebook REF1 includes a plurality records of reference control data divided by a plurality of target patterns, and the plurality records of reference control data are used to set a plurality of antenna elements of each of the reference antenna module, and a plurality of phase shifters and a plurality of amplifiers respectively corresponding to the plurality of antenna elements.

For example, the first reference codebook REF1 may be as shown in Table 1 below:

TABLE 1

1st Reference codebook

| | | Antenna element 1 | Antenna element 2 | | Antenna element N |
|---|---|---|---|---|---|
| Pattern 1 | Phase | 0 degrees | 90 degrees | ... | 180 degrees |
| | Amplifier | ON | ON | | OFF |
| Pattern 2 | Phase | 0 degrees | 90 degrees | | 180 degrees |
| | Amplifier | ON | ON | | OFF |
| | | . | | | |
| | | . | | | |
| | | . | | | |
| Pattern L | Phase | 0 degrees | 90 degrees | ... | 180 degrees |
| | Amplifier | ON | ON | | OFF |

In the first reference codebook REF1, each of the plurality records of reference control data includes a plurality of phase shifter reference parameters and a plurality of amplifier reference parameters used for setting the reference antenna module, the plurality of phase shifter reference parameters correspond to a plurality of reference phases, and the plurality of amplifier reference parameters correspond to a plurality of switching state codes used to indicate switching states of the plurality of amplifiers (for example, 1 for ON, and 0 for OFF). As shown in Table 1, the first reference codebook REF1 can include a plurality records of reference control data for pattern 1 through pattern L. Pattern 1 through pattern L are radiation patterns pointing at different angles. Each record of the control data includes the phases of the phase shifters and the parameters for turning the amplifiers on or off corresponding to antenna element 1, antenna element 2 through antenna element N. The phase shifters may be, for example, 2-bit phase shifters, and switchable phases of the phase shifter are respectively 0 degrees, 90 degrees, 180 degrees, and 270 degrees, which can be used as the reference phases mentioned above, but the present disclosure is not limited thereto.

Taking each antenna module having 6 antenna elements as an example, generation of the first reference codebook REF1 can refer to FIGS. 4A, 4B and 4C. FIGS. 4A to 4C are schematic diagrams for generating a plurality of phases of a reference codebook according to an embodiment of the present disclosure.

Figure 4:
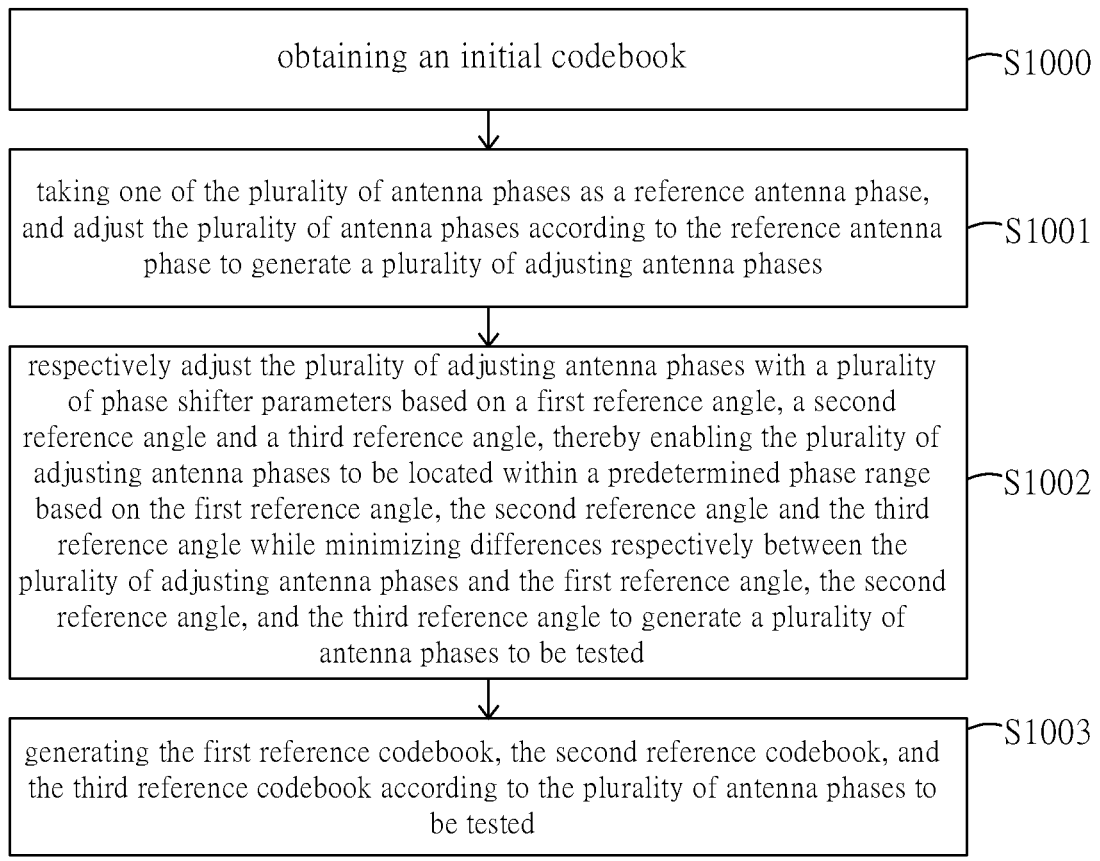
FIG. 4 is a flowchart of a method for generating a reference codebook according to an embodiment of the present disclosure.

As shown in FIG. 4, the calibration method for the beamforming device further includes:

Step S1000: obtaining an initial codebook. The initial codebook has multiple antenna phases of multiple antenna elements of the reference antenna module.

Figure 5A:
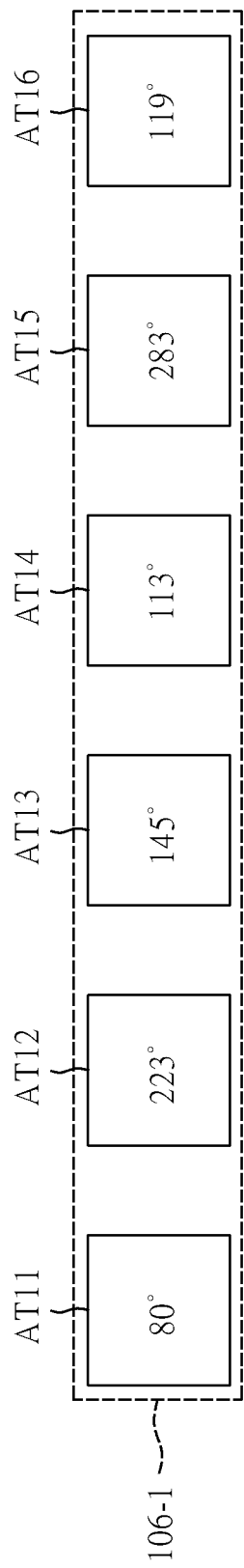
FIGS. 5A to 5C are schematic diagrams for generating a plurality of phases of a first reference codebook according to an embodiment of the present disclosure.

As shown in FIG. 5A, for example, the antenna module 106-1 is set as the reference antenna module, and pattern 1 is set, for example, to measure electrical field information at pattern 1 (assuming at 0 degree angle, that is, an angle associated to the beamforming device 10 or the receiver 14), initial phases of the antenna units AT11, AT12, AT13, AT14, AT15 and AT16 of the antenna module 106-1 shown in FIG. 5A are measured to be 80, 223, 145, 113, 283, 119 degrees, respectively. Next, for other angles, the angle between the two can be changed by rotating the beamforming device 10 or the receiver 14, and the initial phases under other patterns can be generated in the same way, thereby obtaining the initial codebook.

Step S1001: taking one of the plurality of antenna phases as a reference antenna phase, and adjust the plurality of antenna phases according to the reference antenna phase to generate a plurality of adjusting antenna phases.

Figure 5B:
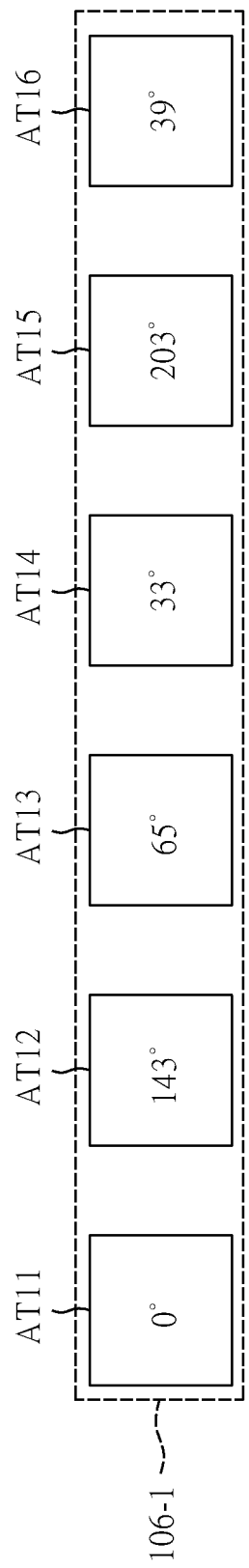

If a signal generated by the antenna unit AT11 is the strongest, the initial phases 223, 145, 113, 283, and 119 degrees of the antenna elements AT12, AT13, AT14, AT15, and AT16 can be shifted by −80 degrees, respectively, based on the antenna element AT11, such that the phases of the antenna elements AT12, AT13, AT14, AT15, and AT16 are changed to 143, 65, 33, 203, and 39 degrees, as shown in FIG. 5B. The initial codebook has an initial precision determined by precision bits of the plurality of phase shifters.

Step S1002: respectively adjust the plurality of adjusting antenna phases with a plurality of phase shifter parameters based on a first reference angle, a second reference angle and a third reference angle, thereby enabling the plurality of adjusting antenna phases to be located within a predetermined phase range based on the first reference angle, the second reference angle and the third reference angle while minimizing differences respectively between the plurality of adjusting antenna phases and the first reference angle, the second reference angle, and the third reference angle to generate a plurality of antenna phases to be tested.

In detail, the phases of the antenna elements AT12, AT13, AT14, AT15 and AT16 are minimized based on a phase reference value, for example, 0 degrees, by adjusting the phase shifters corresponding to the antenna elements AT12, AT13, AT14, AT15 and AT16. Since a RF circuit of the antenna module 106-1 has built-in phase shifters PS11 through PS2N with a precision of 2 bits, it can perform minimization to achieve phase matching by $360/2^2$ degrees (i.e., 90 degrees), that is, the phases of the antenna elements AT11, AT12, AT13, AT14, AT15 and AT16 are respectively adjusted by phase shifter parameters of 180, 270, 0, 180 and 0 degrees to obtain 323, 337, 33, 383 and 39 degrees. Since the phase is cyclic with 360 degrees, the phases of −37, −25, 33, 23, and 39 are equivalently obtained, that is, the closest to the first reference angle, which is 0 degrees. At this time, the first reference codebook REF1 is obtained at the pattern 1, that is, the pattern with an angle of 0 degrees, and the phase shifter parameters corresponding to the antenna elements AT12, AT13, AT14, AT15 and AT16 of the antenna module 106-1 are 180, 270, 0, 180 and 0 degrees. Other patterns can be adjusted in similar manners, thereby generating the first reference codebook REF1.

In the above embodiment, the first reference codebook REF1 can be directly used to control the reference antenna module (that is, the antenna module 106-1) to transmit and receive signals. Next, it is needed to generate the first reference codebook REF1, the second reference codebook REF2, and the third reference codebook REF3 for the antenna modules 106-2, . . . , 106-M being the calibration antenna modules.

It should be noted that the first reference codebook REF1 has a first reference angle, the second reference codebook REF2 has a second reference angle, and the third reference codebook REF3 has a third reference angle. Here, the so-called first reference angle can be traced back to FIGS. 5B and 5C. In the process from FIGS. 5B to 5C, the phase shifters corresponding to the antenna elements AT12, AT13, AT14, AT15, and AT16 have been adjusted so that the antenna elements AT12, AT13, AT14, AT15 and AT16 are minimized based on a phase reference value, such as 0 degrees, and the phase reference value (0 degrees) corresponding to the first reference codebook REF1 is the first reference angle. In some embodiments, the second reference angle and the third reference angle may be different from the first reference angle by a predetermined angle, for example, 45 degrees. Therefore, the second and third reference angles may be 45 degrees and −45 degrees.

Figure 5C:
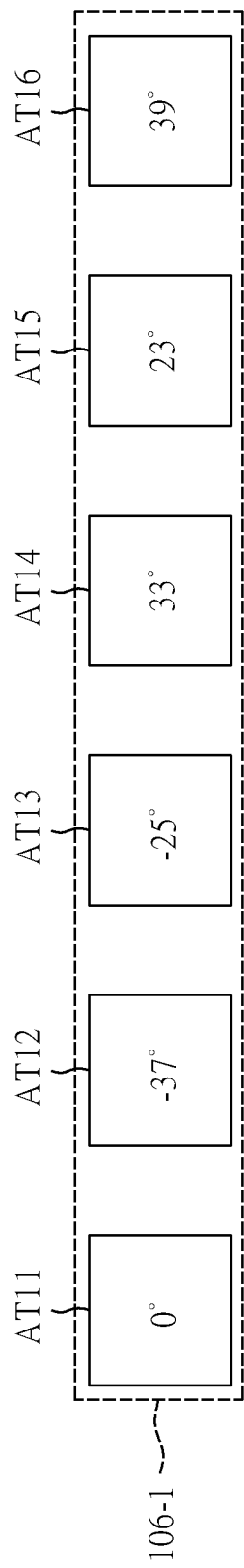

Therefore, for the calibration antenna modules, the same process as the above FIGS. 5A to 5C is used to generate the second reference codebook REF2 having the second reference angle.

Figure 6A:
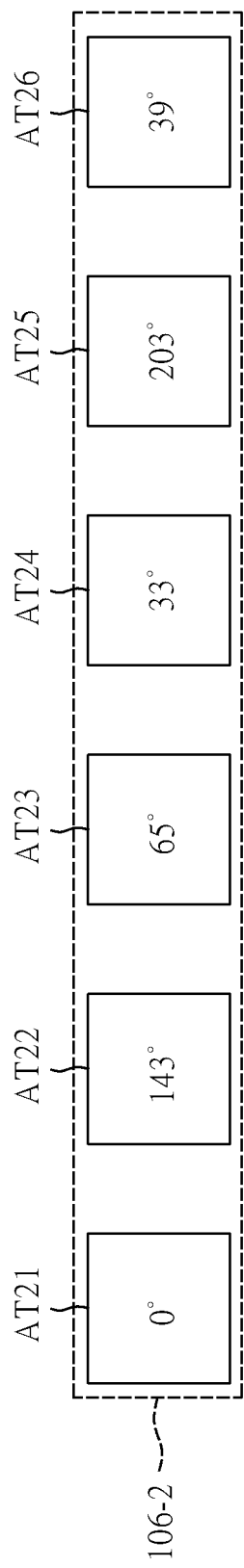
FIGS. 6A to 6C are schematic diagrams for generating a plurality of phases of a second reference codebook according to an embodiment of the present disclosure.
Figure 6B:
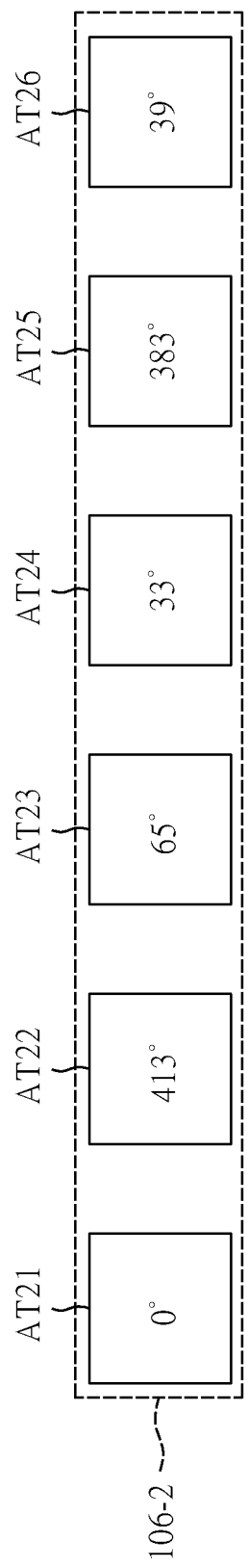
Figure 6C:
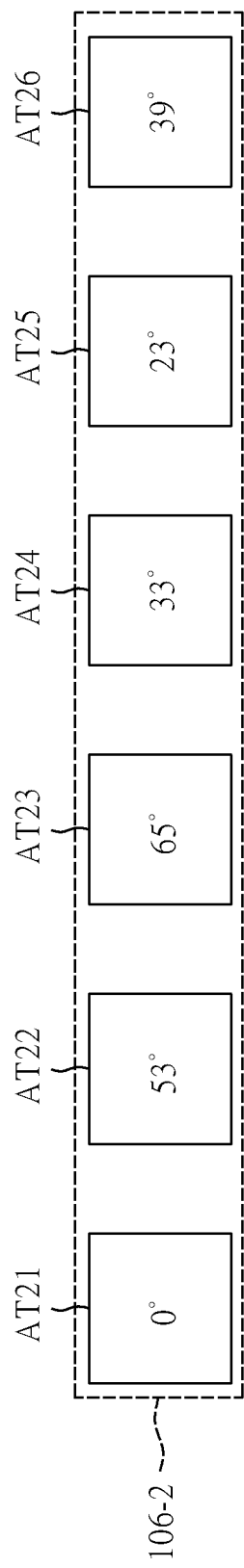

Reference can be made to FIGS. 6A to 6C, which are schematic diagrams for generating a plurality of phases of a second reference codebook according to an embodiment of the present disclosure. As shown in FIGS. 6A, 6B, and 6C, for example, electric field information is measured at an angle of 0 degrees by setting the pattern 1, and initial phases of the antenna elements AT11, AT12, AT13, and AT14 of the antenna module 106-1 shown in FIG. 5A can be respectively shifted by −80 degrees and served as the initial phases of the antenna units AT21, AT22, AT23, AT24, AT25, and AT26 of the antenna module 106-2, which are 0, 143, 65, 33, 203, 39 degrees. Next, the phases of the antenna elements AT21, AT22, AT23, AT24, AT25, and AT26 are adjusted based on another phase reference value (that is, the second reference angle), such as 45 degrees, by adjusting the phase shifters corresponding to the antenna elements AT21, AT22, AT23, AT24, AT25, and AT26. Since a RF circuit of the antenna module 106-2 has built-in phase shifters PS21 through PS2N with a precision of 2 bits, it can perform minimization to achieve phase matching by $360/2^2$ degrees (i.e., 90 degrees), that is, the phases of the antenna elements AT21, AT22, AT23, AT24, AT25 and AT26 are respectively adjusted by phase shifter parameters of 0, 270, 0, 0, 180 and 0 degrees to obtain 0, 413, 65, 33, 383 and 39 degrees. Since the phase is cyclic with 360 degrees, the phases of 0, 53, 65, 33, 23 and 39 degrees are equivalently obtained, that is, the closest to the first reference angle, which is 45 degrees. At this time, the second reference codebook REF2 is obtained at the predetermined pattern with an angle of 0 degrees, and the phase shifter parameters corresponding to the antenna elements AT21, AT22, AT23, AT24, AT25, and AT26 of the antenna module 106-1 are 0, 270, 0, 0, 180 and 0 degrees. After the phases are adjusted by the phase shifter, 0, 53, 65, 33, 23 and 39 degrees have minimum phase differences relatively to 45 degrees, respectively.

Next, since the phases in other patterns have been generated by rotating the beamforming device 10 or the receiver 14 in the initial codebook, the phases for other angles can be minimized in the same manner with respect to the second reference angle (45 degrees) to obtain the second reference codebook REF2.

Figure 7A:
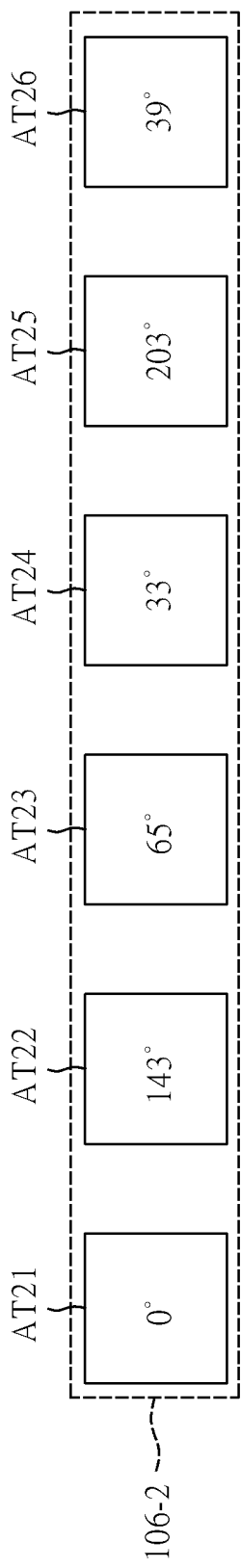
FIGS. 7A to 7C are schematic diagrams for generating a plurality of phases of a third reference codebook according to an embodiment of the present disclosure.
Figure 7B:
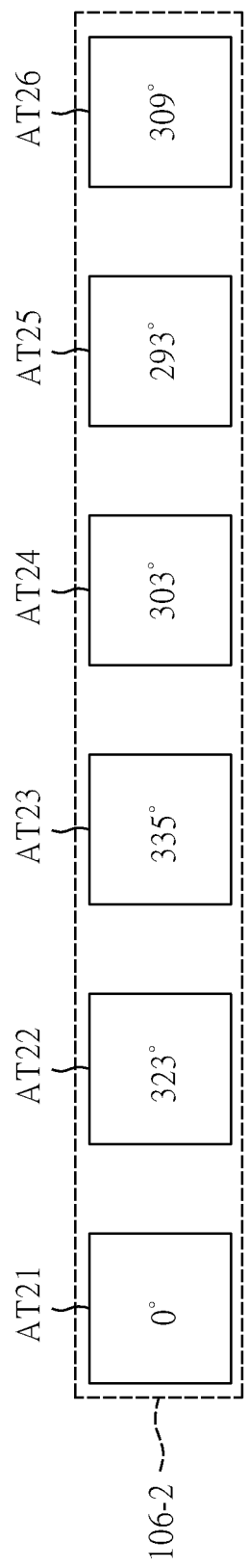
Figure 7C:
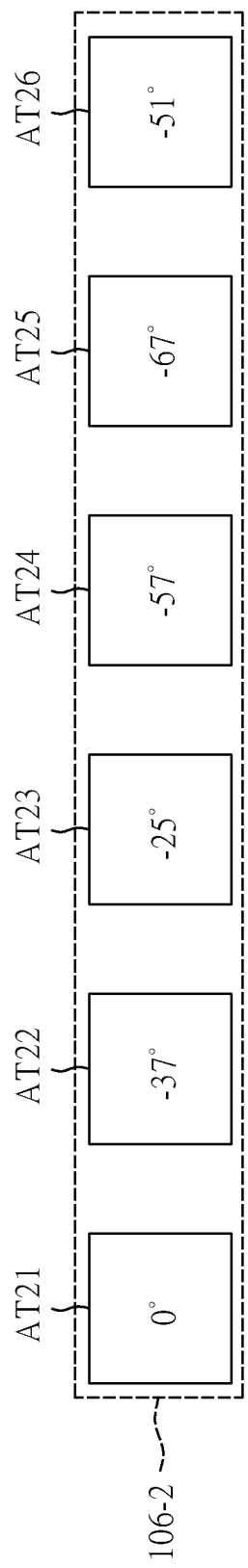

Similar method can also be used to generate a third reference codebook REF3 with the third reference angle. Reference can be made to FIGS. 7A to 7C, which are schematic diagrams for generating a plurality of phases of a third reference codebook according to an embodiment of the present disclosure. As shown in FIGS. 7A, 7B, and 7C, for example, electric field information is measured at an angle of 0 degrees by setting the pattern 1, and initial phases of the antenna elements AT11, AT12, AT13, and AT14 of the antenna module 106-1 shown in FIG. 5A can be respectively shifted by −80 degrees and served as the initial phases of the antenna units AT21, AT22, AT23, AT24, AT25, and AT26 of the antenna module 106-2, which are 0, 143, 65, 33, 203, 39 degrees. Next, the phases of the antenna elements AT21, AT22, AT23, AT24, AT25, and AT26 are adjusted based on another phase reference value (that is, the third reference angle), such as −45 degrees, by adjusting the phase shifters corresponding to the antenna elements AT21, AT22, AT23, AT24, AT25, and AT26. Since a RF circuit of the antenna module 106-2 has built-in phase shifters PS21 through PS2N with a precision of 2 bits, it can perform minimization to achieve phase matching by $360/2^2$ degrees (i.e., 90 degrees), that is, the phases of the antenna elements AT21, AT22, AT23, AT24, AT25 and AT26 are respectively adjusted by phase shifter parameters of 0, 180, 270, 270, 90 and 270 degrees to obtain 0, 323, 335, 303, 293 and 309 degrees. Since the phase is cyclic with 360 degrees, the phases of 0, −37, −25, −57, −67 and −51 degrees are equivalently obtained. At this time, the third reference codebook REF3 is obtained at the predetermined pattern with an angle of 0 degrees, and the phase shifter parameters corresponding to the antenna elements AT21, AT22, AT23, AT24, AT25, and AT26 of the antenna module 106-1 are 0, 180, 270, 270, 90 and 270 degrees. After the phases are adjusted by the phase shifter, 0, −37, −25, −57, −67 and −51 degrees have minimum phase differences relatively to −45 degrees, respectively.

Next, since the phases in other patterns have been generated by rotating the beamforming device 10 or the receiver 14 in the initial codebook, the phases for other angles can be minimized in the same manner with respect to the second reference angle (−45 degrees) to obtain the third reference codebook REF3.

In alternative embodiments, the first reference angle, the second reference angle, and the third reference angle are not limited to 0, 45 degrees, and −45 degrees described in the above embodiments, but may also be 0, 30 degrees, and −30 degrees.

Step S1003: generating the first reference codebook, the second reference codebook, and the third reference codebook according to the plurality of antenna phases to be tested.

Returning to the calibration method of the present disclosure, and the method proceeds to step S101: performing a test process on the at least one calibration antenna module. Here, the test process includes the following steps.

Step S102: configuring the baseband circuit to control, according to a predetermined target pattern, the reference antenna module with a plurality records of control data corresponding to the predetermined target pattern in the first reference codebook, and configuring the baseband circuit to control the at least one calibration antenna module by using a plurality records of control data corresponding to the predetermined target pattern respectively in the first reference codebook, the second reference codebook and the third reference codebook to generate a plurality of test signals.

Step S103: configuring the receiver 14 to receive a plurality of test signals.

Step S104: configuring the computing device 12 to process the plurality of test signals to respectively calculate equivalent isotropically radiated powers (EIRP) of the predetermined target patterns respectively corresponding to the plurality of test signals and generate a plurality of test results.

Step S105: configuring the computing device 12 to set the codebook having the maximum EIRP as a predetermined codebook used in transmitting and receiving signals in the predetermined target pattern by the calibration antenna module according to the plurality of test results. For example, during the calibration of the antenna module 106-2, the first reference codebook REF1 can be used to obtain the maximum EIRP, which represents that the antenna module 106-2 has the smallest phase difference when transmitting and receiving signals simultaneously with the antenna module 106-1 according to the first reference codebook REF1. In other words, the hardware error between the antenna modules 106-1 and 106-2 can be eliminated. Therefore, the first reference codebook REF1 can be set as the predetermined codebook used by the antenna module 106-2 to transmit and receive signals.

Then, the computing device 12 may be further configured to generate instruction data INS based on the above steps and store the instruction data INS in the memory unit 102, so that when the beamforming device 10 transmits and receives signals in a plurality of predetermined target patterns, the baseband circuit 104 can obtain corresponding predetermined codebooks from the first reference codebook REF1, the second reference codebook REF2, and the third reference codebook REF3 to control the antenna modules 106-1 to 106-M to transmit and receive signals according to the predetermined target patterns.

Therefore, after applying the calibration method for the beamforming device of the present disclosure, a beamforming device 10 shown in FIG. 1 can be further provided, which includes a processor 100, a memory unit 102, a baseband circuit 104, and multiple antennas modules 106-1 through 106-M. The memory unit 102 stores a first reference codebook REF1, a second reference codebook REF2, a third reference codebook REF3, and instruction data INS. Each of the first reference codebook REF1, the second reference codebook REF2 and the third reference codebook REF3 includes a plurality records of calibration control data divided by a plurality of target patterns, and the first reference codebook REF1, the second reference codebook REF2, and the third reference codebook REF3 respectively have reference angles (i.e., 0 degrees, 45 degrees and −45 degrees mentioned above) that are different from each other.

The instruction data INS is used to respectively assigning a predetermined codebook from the plurality of reference codebooks for the baseband circuit to control the antenna modules 106-1 through 106-M when the antenna modules 106-1 through 106-M are transmitting and receiving signals.

In a particular embodiment, when a system of the beamforming device 10 is initialized, the processor 100 thereof can automatically read the instruction data INS from the memory unit 102 and reorganize the predetermined codebook indicated by the instruction data INS to produce a complete version codebook to be directly used by the baseband circuit 104 to control the antenna modules 106-1 to 106-M for signal transmission and reception.

In conclusion, the beamforming device, the calibration method and the calibration system using the same provided by the present disclosure can effectively improve the phase precision from the precision supported by the phase shifter according to the reference angles corresponding to the plurality of reference codebooks, and can reduce the number of pre-stored codebooks and calibration time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A calibration method for a beam forming device including a processor, a memory unit, a baseband circuit and a plurality of antenna modules, the plurality of antenna modules including a reference antenna module and at least one calibration antenna module, and each of the plurality of antenna modules including a plurality of antenna elements, a plurality of phase shifters and a plurality of amplifiers corresponding to the plurality of antenna elements, the calibration method comprising:

configuring the memory unit to store a first reference codebook, a second reference codebook, and a third reference codebook, wherein the first reference codebook is used to control a plurality phase shifters and a plurality of amplifiers of the reference antenna module, and the first reference codebook has a first reference angle, the second reference codebook has a second reference angle, and the third reference codebook has a third reference angle; and performing a test process on the at least one calibration antenna module, wherein the test process includes the following steps:

configuring the baseband circuit to control, according to a predetermined target pattern, the reference antenna module with a plurality records of control data corresponding to the predetermined target pattern in the first reference codebook, and configuring the baseband circuit to control the at least one calibration antenna module by using a plurality records of control data corresponding to the predetermined target pattern respectively in the first reference codebook, the second reference codebook and the third reference codebook to generate a plurality of test signals;

configuring a receiver to receive the plurality of test signals;

configuring the computing device to process the plurality of test signals to respectively calculate equivalent isotropically radiated powers (EIRPs) of the predetermined target pattern respectively corresponding to the plurality of test signals and generate a plurality of test results; and configuring the computing device to set one of the first reference codebook, the second reference codebook and the third reference codebook having the maximum EIRP as at least one predetermined codebook used in transmitting and receiving signals in the predetermined target pattern by the beamforming device according to the plurality of test results.

2. The calibration method according to claim 1, wherein the second reference angle and the third reference angle are each different from the first reference angle by a predetermined angle.

3. The calibration method according to claim 1, further comprising:

obtaining an initial codebook having a plurality of antenna phases of the plurality of antenna elements of the reference antenna module;

taking one of the plurality of antenna phases as a reference antenna phase, and adjusting the plurality of antenna phases according to the reference antenna phase to generate a plurality of adjusting antenna phases;

respectively adjusting the plurality of adjusting antenna phases with a plurality of phase shifter parameters based on the first reference angle, the second reference angle and the third reference angle, thereby enabling the plurality of adjusting antenna phases to be located within a predetermined phase range based on the first reference angle, the second reference angle and the third reference angle while minimizing differences respectively between the plurality of adjusting antenna phases and the first reference angle, the second reference angle, and the third reference angle to generate a plurality of antenna phases to be tested; and generating the first reference codebook, the second reference codebook, and the third reference codebook according to the plurality of antenna phases to be tested.

4. The calibration method according to claim 3, further comprising:

performing the test process on each of the at least one calibration antenna module to set the at least one predetermined codebook, wherein the initial codebook has an initial precision determined by precision bits of the plurality of phase shifters.

5. The calibration method according to claim 1, further comprising recording the generated at least one predetermined codebook to generate instruction data to be stored to the memory unit, wherein when the baseband circuit transmits and receives signals according to the predetermined target pattern, the instruction data is used for the baseband circuit to obtain the corresponding at least one predetermined codebook from the first reference codebook, the second reference codebook and the third reference codebook to control the plurality of antenna modules.

6. A calibration system for beamforming device, comprising:

a computing device;
a beamforming device connected to the computing device and including:
a processor;
a memory unit;
a baseband circuit; and
a plurality of antenna modules, including a reference antenna module and at least one calibration antenna module, wherein each of the plurality of antenna modules includes a plurality of antenna elements, and a plurality of phase shifters and a plurality of amplifiers corresponding to the plurality of antenna elements;

a receiver; and a testing device;

wherein the baseband circuit is configured to store a first reference codebook, a second reference codebook, and a third reference codebook into the memory unit, wherein the first reference codebook is used to control a plurality phase shifters and a plurality of amplifiers of the reference antenna module, and the first reference codebook has a first reference angle, the second reference codebook has a second reference angle, and the third reference codebook has a third reference angle;

wherein the computing device is configured to perform a test process on the at least one calibration antenna module, wherein the test process includes the following steps:

configuring the baseband circuit to control, according to a predetermined target pattern, the reference antenna module with a plurality records of control data corresponding to the predetermined target pattern in the first reference codebook, and configuring the baseband circuit to control the at least one calibration antenna module by using a plurality records of control data corresponding to the predetermined target pattern respectively in the first reference codebook, the second reference codebook and the third reference codebook to generate a plurality of test signals; and configuring the receiver to receive the plurality of test signals;

configuring the computing device to process the plurality of test signals to respectively calculate equivalent isotropically radiated powers (EIRPs) of the predetermined target pattern respectively corresponding to the plurality of test signals and generate a plurality of test results; and configuring the computing device to set one of the first reference codebook, the second reference codebook and the third reference codebook having the maximum EIRP as at least one predetermined codebook used in transmitting and receiving signals in the predetermined target pattern by the beamforming device according to the plurality of test results.

7. The calibration system according to claim 6, wherein the second reference angle and the third reference angle are each different from the first reference angle by a predetermined angle.

8. The calibration system according to claim 6, wherein the computing device is configured to:

obtain an initial codebook having a plurality of antenna phases of the plurality of antenna elements of the reference antenna module;

take one of the plurality of antenna phases as a reference antenna phase, and adjust the plurality of antenna phases according to the reference antenna phase to generate a plurality of adjusting antenna phases;

respectively adjust the plurality of adjusting antenna phases with a plurality of phase shifter parameters based on the first reference angle, the second reference angle and the third reference angle, thereby enabling the plurality of adjusting antenna phases to be located within a predetermined phase range based on the first reference angle, the second reference angle and the third reference angle while minimizing differences respectively between the plurality of adjusting antenna phases and the first reference angle, the second reference angle, and the third reference angle to generate a plurality of antenna phases to be tested; and generate the first reference codebook, the second reference codebook, and the third reference codebook according to the plurality of antenna phases to be tested.

9. The calibration system according to claim 8, wherein the computing device is configured to perform the test process on each of the at least one calibration antenna module to set the at least one predetermined codebook, wherein the initial codebook has an initial precision determined by precision bits of the plurality of phase shifters, and the at least one predetermined codebook has a calibration precision higher than the initial codebook.

10. The calibration system according to claim 6, wherein the computing device is configured to record the generated at least one predetermined codebook to generate instruction data to be stored to the memory unit, wherein when the baseband circuit transmits and receives signals according to the predetermined target pattern, the instruction data is used for the baseband circuit to obtain the corresponding at least one predetermined codebook from the first reference codebook, the second reference codebook and the third reference codebook to control the plurality of antenna modules.

* * * * *